United States Patent [19]

Beckley

[11] 4,322,464
[45] Mar. 30, 1982

[54] FUSION LAMINATED HIGH-TEMPERATURE FABRIC

[75] Inventor: Don A. Beckley, Newport Beach, Calif.

[73] Assignee: HITCO, Irvine, Calif.

[21] Appl. No.: 909,045

[22] Filed: May 24, 1978

Related U.S. Application Data

[62] Division of Ser. No. 739,039, Nov. 5, 1976, Pat. No. 4,119,481.

[51] Int. Cl.³ .......................... B32B 3/30; B32B 19/04
[52] U.S. Cl. .................................... 428/175; 428/161; 428/162; 428/251; 428/262
[58] Field of Search ............... 156/272, 273, 306, 322; 428/161, 162, 171, 172, 195, 196, 210, 245, 262, 268, 920, 921, 426, 442, 408, 251, 339, 174, 175

[56] References Cited

U.S. PATENT DOCUMENTS

| | | | |
|---|---|---|---|
| 2,684,319 | 7/1954 | Arnold | 156/273 |
| 3,222,237 | 12/1965 | McKelvy | 428/172 |
| 3,266,966 | 8/1966 | Patchell | 428/172 |
| 3,360,412 | 12/1967 | James | 156/272 |
| 3,398,044 | 8/1968 | Plueddemann | 156/272 |
| 3,505,147 | 4/1970 | Eulie | 156/322 |
| 3,514,308 | 5/1970 | Scott, Jr. et al. | 156/286 |
| 3,556,887 | 1/1971 | Adcock | 156/273 |
| 3,944,454 | 3/1976 | Burgheimer | 156/309 |

*Primary Examiner*—Stanley S. Silverman
*Attorney, Agent, or Firm*—Marvin E. Jacobs

[57] ABSTRACT

A high temperature woven refractory fabric is coated by preheating the surface of the fabric by means of actinically matched radiation, suitably infra-red, and then fusion-bonding the inner surface of a thermoplastic film such as polyurethane to at least one surface of the fabric to fusion-bond the film thereto. The warm fusion-bonded film is then processed through a non-heated nip-roll assembly in which at least one of the rollers has a soft facing such as rubber which impresses the film into the interstitial fillweft woven intersections to form a fabric-appearing coated product. The infra-red wave length is selected for maximum absorption by the fabric and the intensity of the radiation and speed of the film are controlled to provide sufficient but not excessive fusion or melting of the film. The coating apparatus includes a control device in which an infra-red sensing non-contact thermometer senses the temperature of the fabric as it leaves the infra-red heater and develops a control signal that controls the speed of the fabric through the system.

7 Claims, 2 Drawing Figures

FUSION LAMINATED HIGH-TEMPERATURE FABRIC

CROSS-REFERENCE TO RELATED APPLICATION

This application is a divisional of Ser. No. 739,039, filed Nov. 5, 1976, now U.S. Pat. No. 4,119,481.

BACKGROUND OF THE INVENTION

1. Field of the Invention

The present invention relates to a continuous process for laminating thermoplastic films to high heat capacity woven fabrics without the use of adhesives, to the resulting product and to apparatus for producing such a product.

2. Description of the Prior Art

Asbestos has generally been the material of choice for high-temperature applications such as protective clothing or wrapping. However, recently asbestos has been identified as a carcinogenic agent and therefore, alternative materials are needed for applications involving occupational safety.

High-temperature resistant fabrics have been developed by the aerospace industry such as carbon, graphite, boron and amorphous silica such as Refrasil which is a continuous filament flexible amorphous silica textile material with excellent insulation characteristics for high-temperature applications. However, these filaments and especially Refrasil are generally rough and abrasive, tending to bend, break and fray during weaving. Thus, fabrication by conventional methods of stitching, sewing, grommeting is not possible.

An obvious expedient to control these disadvantages would be to adhere a smooth continuous film to the surface of the high-temperature fabric. Generally adhesives have been utilized to laminate films to fabric. However, adhesives are an unnecessary non-refractory mass and would tend to melt and cause delamination in the environment of intended use thus lowering the maximum service temperature of the fabric. Furthermore, adhesives increase the cost of the final laminated product and also increase the flammability and the bulkiness of the product and decrease flexibility of the laminated film. Film or liquid adhesives also interfere with the production of fabric appearing products in that they are generally hazy, colored or prevent clear naturally looking coated products. Since adhesives tend to flow into the interstitial spaces of the woven web, after application of the continuous film, the fabric will tend to have a non-woven appearance rather than a woven fabric appearance.

SUMMARY OF THE INVENTION

An improved high-temperature fabric coating system is provided in accordance with the invention. The fabric is light-weight and has improved abrasion resistance and durability and provides an acceptable surface for direct body contact by humans. The fabric is produced according to this invention in a continuous process in which a thermoplastic film having a heat distortion temperature lower than that of the fabric is laminated to the fabric in a continuous process without the use of adhesives. The resulting product possesses improved abrasion resistance, tear resistance, chemical resistance, oil resistance, gas barrier, fraying, grip and decreased flammability as compared to adhesive bonded products. Results are obtained with maximum efficiency in material, labor and energy.

The fabric web is heated by high energy radiation, suitably infra-red, which is preferentially absorbed in a short time and space resulting in an increase in temperature sufficient to produce desired degree of adhesion with the thermoplastic film. The heated fabric web is then brought into contact with a surface of a cold thermoplastic film. The hot surface of the web softens the inner surface of the film without softening nor rendering the outer surface of the film sticky. The softened inner portion is compressed into the weave of the fabric by a pair of nip-rollers at least one of which has a resilient surface such as rubber. The coated fabric is then rewound optionally with a separator film if it has not cooled sufficiently before rewinding.

The invention also relates to the apparatus for producing the product including a non-contact temperature sensing and speed controller system adapted to produce optimized heating and travel of the fabric through the apparatus. The invention also relates to selection of optimum materials and time temperature parameters for producing a range of products useful in heat insulation applications, and also in products in which resistance to chemical or physical environmental conditions is required. In very high temperature applications, the coating may be sacrificed during use. However, the coating provides abrasion resistance and fabrication of the product into special form.

The apparatus and method of the invention produce the above described advantages since the adhesive and adhesive applicating steps and apparatus are eliminated. This decreases cost and flammability, increases service temperature and improves appearance of the product as discussed above. Since the web and not the film is heated this minimizes deformation and distortion of the thin film as it is being applied. When it was attempted to heat the film, rather than the fabric, it was found that the film could not retain enough heat capacity to permit bonding to occur and the heat was immediately transferred to the cold fabric substrate. Furthermore, the film tended to distort, shrink or stretch under tension when heated.

The bonding system of the invention which is preferentially sensitive to IR wave length emissions, primarily heats the fabric surface and not necessarily the complete cross-section of the fabric, nor the air-gap between heaters and the fabric. This minimizes energy input and provides quick and even heating of the fabric surface up to temperature without discomfort to the environment in heat or noise and removes moisture and absorbed gas from the surface prior to the bonding step. Since the heat necessary for softening the film is provided by the web, the nip-rollers need not be heated as in other processes and this minimizes film sticking of the film to their surfaces. Furthermore, only the inner surface of the film is softened at the moment of entry of the film-web assembly into the nip. The process of the invention is adaptable to applying a single film to one surface of the fabric or applying films simultaneously to both surfaces of the fabric.

The refractory type fabric of the invention acts as a form for the nip-roller embossing step and the softened thermoplastic film is pressed into the interstices to provide a clear, smooth fabric-appearing product. In an examination of the finished product the presence of the film is difficult to discern when clear, uncolored films are utilized. The fabric processed in accordance with the invention can now be fabricated with the conventional methods of stitching, sewing, grommeting without fear of abrasion or fraying. The efficient absorption of IR radiation by the fabric provides lower fuel consumption and overall energy conservation. The treated textile offers a variety of applications such as furnace curtains, welding protection cloth, personnel shields, preheat and weld stress relieving thermal blankets and many other applications where high heat is a problem.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
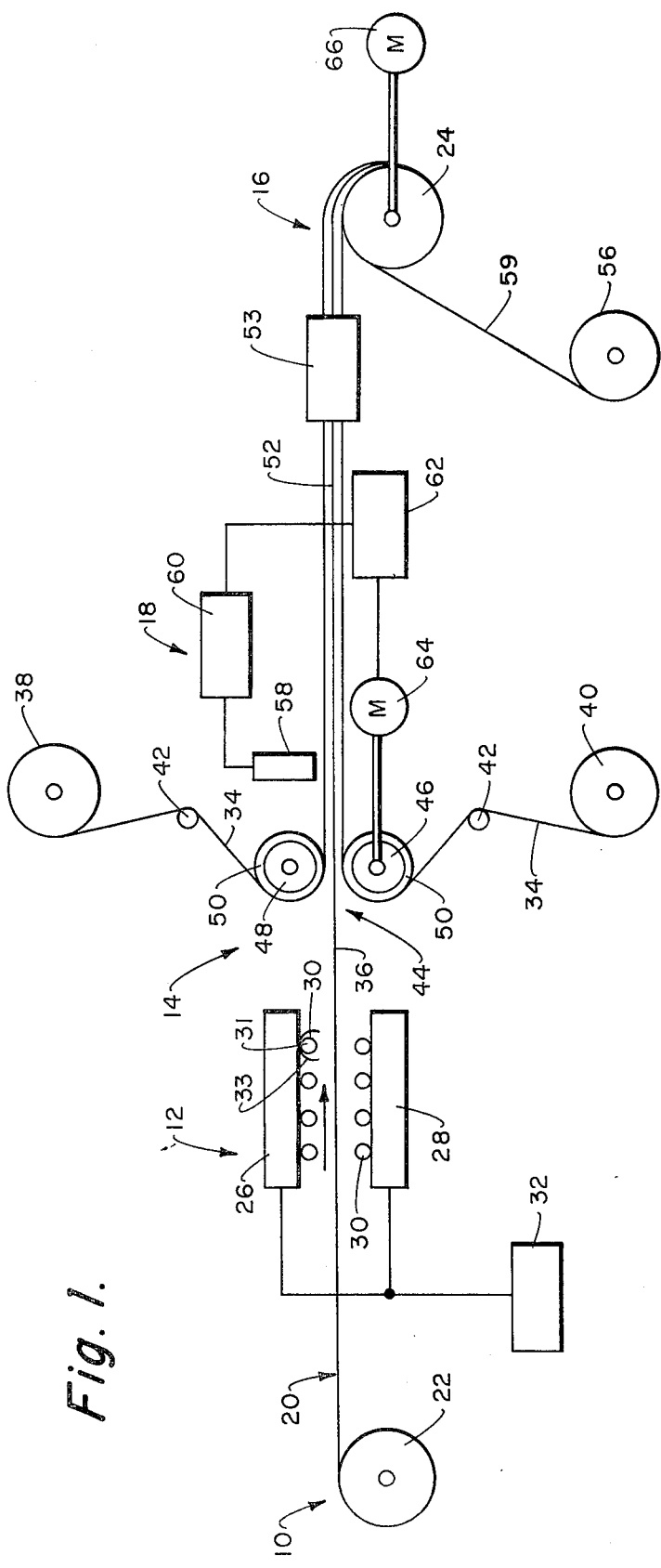
FIG. 1 is a schematic view of apparatus for producing the improved coated fabric in accordance with the invention.

Referring now to FIG. 1, the fusion laminating system of the invention generally includes a fabric supply station 10, fabric heating zone 12, film applying and embossing station 14 and a fabric wind-up 16. The system includes a speed controller assembly 18.

A continuous fabric web 20 supplied from a braked or free-wheeling roll 22 is pulled at controlled speed throughout the system by a driven nip-roll and/or take up roll. The web 20 is heated to a controlled temperature as it passes between the heating zone formed by upper and lower support members 26, 28. Infra-red heating elements 30 such as Calrod heaters 31 disposed within reflectors 33 are mounted on the inner surfaces of the members 26, 28 and are connected to electrical supply 32. The infra-red radiation is preferentially absorbed by the web and heats it to a temperature sufficient to produce the desired degree of adhesion to the film 34. Amorphous silica, quartz and fiberglass and other fabrics have high absorptance of infra-red at 2-3 microns. Calrod heaters emitting primarily at 1-5 microns have shown good efficiency in heating the fabric to temperature necessary for softening of the film 34 may be applied to the one or both surfaces of the heated web 36.

As illustrated, film 34 is applied to both surfaces of the heated web 36. A sheet of film of suitable thickness is drawn from supply rolls 38, 40 and by film spreaders 42, suitably chevron-shaped into the nip 44 between rolls 46, 48. At least one and preferably both rolls 46, 48 have a resilient sleeve 50, suitably formed of rubber.

The heat retained in the high heat capacity heated web 36 softens the film 34. The film is directly fusion-laminated to the fabric 36 without any intermediate adhesive by the pressure of the nip-rolls 46, 48 which also compresses the film into the weave of the fabrics as shown in FIG. 2.

The warm film laminated fabric 52 is then rewound on take-up roll 24, optionally utilizing a separator sheet 59 such as silicone-treated paper supplied by roll 56 if the laminated film fabric assembly 52 has not cooled sufficiently to be non-self-adherent. The fabric may be passed through a cooler 53 before rewind to avoid the use of a separator sheet.

The speed of the fabric through the system is controlled in relation to the temperature of the heated fabric 36 as it is brought into contact with the film. However, the spacing between the heating zone and nip is short and there may be stray radiation in this area. Therefore the temperature sensor is usually placed at the exit of the nip-rolls and the temperature of the outside of the film-fabric assembly is calibrated to yield a satisfactory product. The temperature of film-fabric assembly 36 is sensed after leaving the nip 44 zone 12 by means of a non-contact infra-red thermometer 58 such as a Mikron type pyrometer or alternative measuring device. The thermometer 58 develops an analog signal which is processed by a voltage comparator 60 which develops a signal delivered to the power supply 62 for the variable speed motor 64 for the nip-roll 46. The other nip-roll 48 may have a slip-clutch mount and the drive for the take-up roll 24 may be a torque-limiting motor 66.

Figure 2:
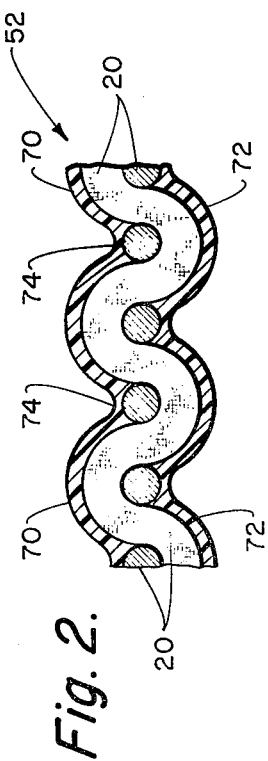
FIG. 2 is a cross-sectional view of the coated fabric.

As shown in FIG. 2, the laminated film-fabric assembly 52 has a thin, continuous film 70, 72 directly laminated to each surface of the fabric web 20 and is compressed into the filaments and into the weave intersections 74 to provide a non-planar woven-like surface. The film encapsulates the outer surface of the fibers and weave intersections.

The continuous web may be a woven or non-woven fabric, tape or cloth. The principal requirement is that the web have a heat distortion temperature greater than the fusion temperature of the thermoplastic film. The woven web may be a natural or synthetic organic material such as cotton, or Kevlar which is an aramide. Preferred fabrics are formed from inorganic fibers such as carbon fibers, graphite fibers, boron fibers, Fiberglass fibers, quartz fibers and preferably amorphous silica such as Refrasil. Asbestos may also be utilized since the irritating fibrils and fiber ends would be completely encapsulated.

Refrasil is manufactured by leaching elements from amorphous silica to provide a material having a silicon dioxide content of at least 96% and a chloride content less than 50 ppm. Refrasil fiber does not melt or vaporize until temperatures exceed 3100° F. (932° C.) with little or no change in properties. Refrasil textiles have excellent resistance to thermal shock as well as minimal shrinkage at service temperatures. They are inert to most organic or inorganic materials and can withstand molten splash at 2900° F. (870° C.).

Refrasil fabrics are usually provided as a satin weave in thicknesses from about 0.02 to 0.06 inches, weight from 15-40 oz/yd$^2$, a wrap thread count of 42-54 ends per inch (epi) a fill thread count of from 32-44 epi. The filament diameter generally ranges from 8 to 12 microns and the specific gravity from 2.0 to 2.2 gms/cm$^3$.

The thermoplastic laminating film has a fusion temperature substantially below that of the fabric, generally softening at a temperature of from 250° to 600° F. The thickness of the film may be varied to provide different effects. Thin films having a thickness of the order of 0.5 to 3 mils will be embossed into the fibers and weave of the fabric to provide fabric type products. Films having a thickness greater than fiber diameter tend to give a continuous film appearance similar to wet-look fabrics. The thermoplastic films need not be fully thermoplastic in terms of being able to reversibly melt and harden. They need only soften sufficiently at processing temperature to be able to fusion-bond to the fibers of the fabric. The softened film under pressure of the nip-rolls is pressed into the openings in the multilament fibers and into the weave and firmly locks the film therein. Representative thermoplastic films are polyphenylene sulfide, vinyl films such as polyvinyl chloride, polyvinylidene chloride, polyvinylidene fluoride or thermoplastic polyurethanes and preferably polyesterurethanes.

The thermoplastic film preferably has high tensile strength, modulus and elongation so as to provide the final laminate with good abrasion resistance, puncture resistance, tear resistance and stretch recovery. The film should also have good barrier properties to reduce the hygroscopic properties of Refrasil or other fabric and also should have resistance to corrosive agents, oils, grease and fuels.

Polyesterurethane thermoplastic films are preferred due to the combination of high tensile strength, modulus and elongation, barrier properties and clarity. These films are readily commercially available in thicknesses up to 90 mils, such as Tuftane TF-310 (B. F. Goodrich) films and sheets.

The speed at which a fabric can be coated depends on the heat capacity of the fabric, its absorbency to I.R. and the softening temperature of the laminating film. The cold film should be heated by the hot fabric to just below the temperature at which the film melts or flows. It was found that the wavelength of the infra-red radiation can be preferentially absorbed by the fabric and thus, there is low reflectance and adjacent air is not heated by radiation, though some of the air in the heater is subsequently heated by reradiation and convection from the fabric. Also, since the web has preferential absorption of the I.R. radiation, the surface is heated primarily and the interior portions can remain below fusion temperature. Since the web and not the film is heated, this minimizes deformation and distortion of the thin film. Furthermore, since the surface of the web contains the heat necessary for fusion, an interfacial bond can be formed even with thick thermoplastic films without affecting the outer cold portions thereof. At the nip the film fabric laminate has a thermal gradient extending from the cold outer surface of the film to the hot inner film-outer fabric interface into the cold fabric interior. This thermal gradient is responsible for the optimum fusion bonding of this invention. Other non-selective heating methods result in overcooking the film or provide marginal bonding.

For example, Tuftane melts at 475° F., if the total film was heated to this temperature it would flow into the fabric and disappear. Even at the thicker selvage of the fabric there is evidence of thermoplastic film. Therefore only the inner surface of the film is softened. Other evidence of the differential thermal gradient is the temperature of the outer surface being 400°–425° F. whereas the temperature of the heated fabric is about 1300° F. A heat balance would demonstrate also that only the surface of the fabric is heated. Since the temperature of the fabric drops within a fraction of a second from 1300 to 400°–450° F. only the surface contains heat. Also the equilibrium temperature at the windup reel is 200°–300° F. showing a differential temperature through the film at the nip.

The heater can have a fairly short longitudinal travel zone. For example, a heater having a 60 inch zone heated to 1300° F. was able to heat 12 lb/min Refrasil fabric web traveling at 15–30 feet per minute from ambient to 450° F. The travel between the end of the heating zone and the entrance to the nip-rolls should be very short in order to minimize heat loss, generally less than 12 inches and preferably no more than 6 inches.

The short space between the heater and the nip-rolls will generally preclude mounting the temperature sensing element at that location. Therefore, the element is usually mounted at the exit of the nip-rolls. The system should be calibrated to determine the temperature of the surface of the laminate immediately after lamination.

Examples of practice follow:

A 36 inch width roll of amorphous silica was run through the apparatus of FIG. 1 at 12 lbs. per minute. The heater power supply was set to heat the elements to 1300° F. and the space between the heating elements was 2 inches. The fabric was heated from 75° to 450° F. in ten seconds. The thermal sensing speed controller was set to have a dead band between 450° F. and 500° F. As the temperature of the fabric leaving the nip fell below 450° F. the motor for the lower nip-roll was slowed and as the temperature exceeded 500° F. the speed of the web was increased.

Tuftane TF-310 films 1.0 thick and 38¼ inch wide were fed into the nip and thermally laminated and embossed into the web. The film shrank to 36" width during the bonding operation. The warm laminate was wound onto the take-up roll with a silicone treated separation sheet. The laminate had a shiny clear fabric appearance and had a smooth surface. There was no fraying nor unravelling of the laminated fabric.

Lightweight uncoated amorphous silica fabric was compared to the same fabric coated on both sides with thermoplastic film according to this invention. There was no effect on any of the strength or heat resistance properties of the fabric. However, the seam strength of the coated fabric increased 300%; the abrasion resistance increased 800%, and the unravelling was also improved.

It is to be realized that only preferred embodiments of the invention have been described and that numerous alterations, substitutions and modifications are all permissible without departing from the spirit and scope of the invention as defined in the following claims.

What is claimed is:

1. A coated, high-temperature, woven, refractory fabric having a high heat distortion temperature comprising:
   a woven, inorganic fabric, the fibers of which comprise amorphous silica having a heat distortion temperature above the heat distortion temperature of the thermoplastic film and a thickness form 0.02 to 0.06 inches and having
   at least one surface containing a continuous layer of thermoplastic film having a fusion temperature from 250° F. to 600° F. and a thickness from 0.5 to 3 mils pressure embossed directly into the fibers of the fabric encapsulating the outer surface of the fibers and weave intersections of the fabric.

2. A coated fabric according to claim 1 in which both surfaces of the fabric contain said film.

3. A coated fabric according to claim 1 in which the fibers contain at least 96% silica and less than 50 ppm chlorine.

4. A coated fabric according to claim 3 in which the fabric is a satin weave having a weight from 15–40 oz. per yd$^2$, a warp thread count of 42–54 ends per inch, a fill thread count of 32–44 ends per inch, a filament diameter from 8 to 12 microns and a specific gravity of 2.0 to 2.2 gms/cm$^3$.

5. A coated fabric according to claim 1 in which the thermoplastic film is selected from vinyl, ester and urethane polymers.

6. A coated fabric according to claim 5 in which the polymer is a polyesterurethane.

7. A coated fabric according to claim 1 in which the film is embossed into the weave of the fabric to provide a non-planar, woven-like surface.

* * * * *